No. 653,597. Patented July 10, 1900.
B. THOENS.
COTTON PRESS.
(Application filed Aug. 25, 1899.)
(No Model.) 2 Sheets—Sheet 1.
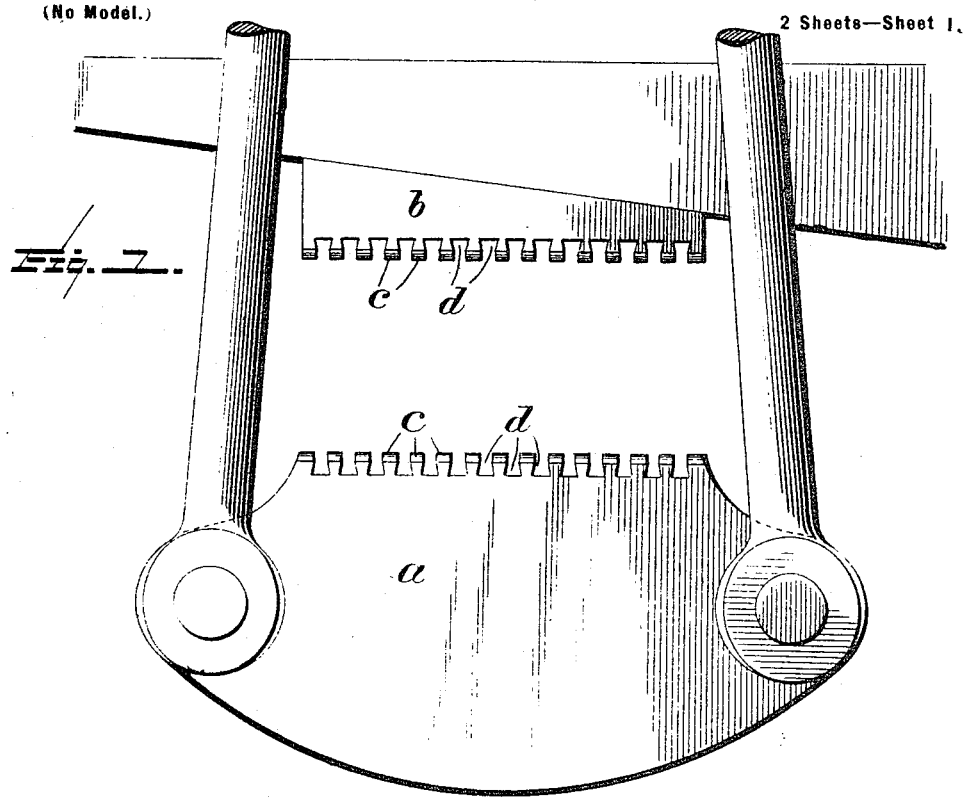
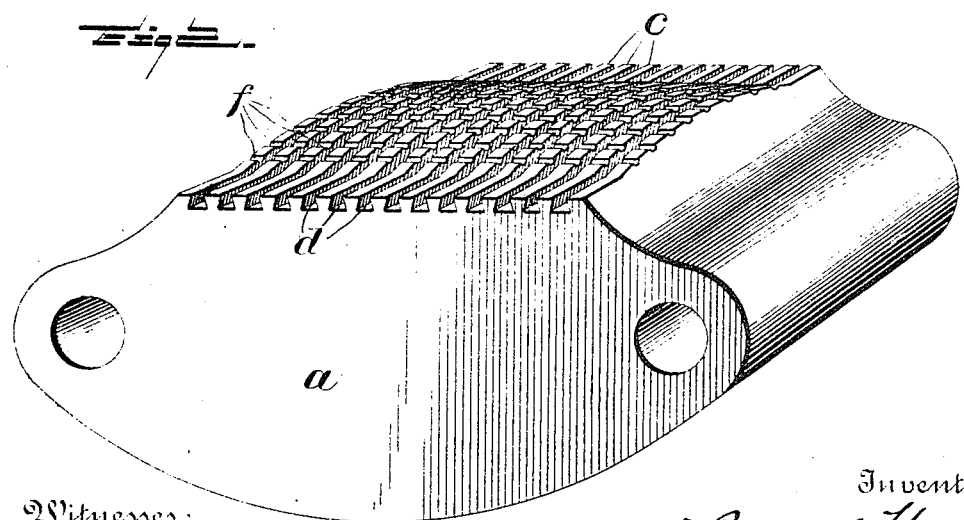

No. 653,597. Patented July 10, 1900.
B. THOENS.
COTTON PRESS.
(Application filed Aug. 25, 1899.)
(No Model.) 2 Sheets—Sheet 2.
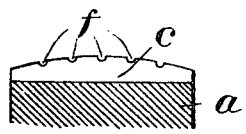
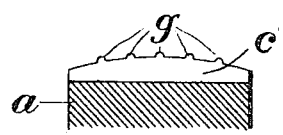
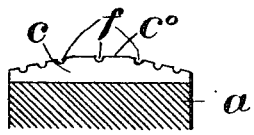
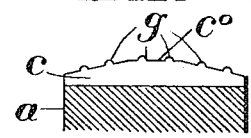
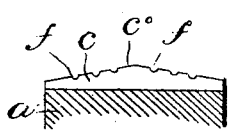
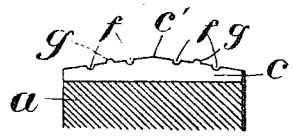
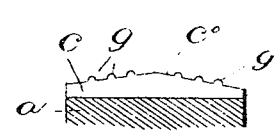
Witnesses
Inventor

UNITED STATES PATENT OFFICE.

BURCHARD THOENS, OF NEW ORLEANS, LOUISIANA.

COTTON-PRESS.

SPECIFICATION forming part of Letters Patent No. 653,597, dated July 10, 1900.

Application filed August 25, 1899. Serial No. 728,493. (No model.)

*To all whom it may concern:*

Be it known that I, BURCHARD THOENS, a subject of the Emperor of Germany, residing at New Orleans, in the parish of Orleans and State of Louisiana, have invented certain new and useful Improvements in Cotton-Presses; and I do hereby declare the following to be a full, clear, and exact description of the invention, such as will enable others skilled in the art to which it appertains to make and use the same.

My invention relates to improvements in presses for compressing bales of cotton or other similar loose fibrous material in a mass; and the objects of my invention are to provide a platen of such construction that the air may be expelled from the bale or mass during the operation of compression, to overcome the objectionable subsequent expansion thereof, and particularly to provide against the spreading of the bale or mass during compression.

Ordinarily as a cotton-bale is compressed it is reduced in size to about one-sixth ($\frac{1}{6}$) of its original volume, and the air confined between the fibers of the material of the bale being unable to escape the compressed bale will have a very large expanding pressure to the square inch. This expanding pressure sometimes causes the bale to violently explode and to set the mass of cotton on fire, due to the heat of the compressed air contained therein; but more frequently it has the effect of bursting the bale-tie and causing extra trouble and labor.

The object of my invention is to provide means for overcoming this objectionable confinement of air within the bale during compression thereof, and this is accomplished by compressing the bale first at the center and with gradual increasing pressure toward the sides thereof, allowing the air to escape gradually during the compression from the densest portion in the center thereof to the portions of the gradual decreasing density at the sides of the bale; but this compression from the center outward would have the effect of causing the bale or mass to spread in the absence of any means specially provided for overcoming this tendency, and this I do by producing corrugations upon the platens, transversely of the channel-bars thereon, as hereinafter described and claimed.

My invention will be understood by reference to the accompanying drawings, wherein similar devices are indicated by similar letters of reference throughout the several views.

Figure 1 represents an elevation of the two pressure-platens of a press embodying my invention. Fig. 2 is a detail perspective view of the lower platen on a similar scale as Fig. 1, showing the upper surface thereof. Fig. 3 is a reduced cross-sectional view of a modified form of platen having channel-bars provided with curved surfaces and transverse grooves or depressions. Fig. 4 is a view similar to Fig. 3, showing the channel-bars provided with transverse ribs instead of grooves. Fig. 5 is a view showing a platen having channel-bars the surfaces of which are bounded by straight lines meeting at obtuse angles instead of by curves, as shown in Figs. 3 and 4. Fig. 6 is a view of a platen having channel-bars similar to those shown in Fig. 5, but provided with transverse ribs in lieu of the grooves. Fig. 7 is a similar view showing a platen having arched channel-bars of a modified outline, the surfaces of which are bounded by two straight lines meeting at the center or apex of the platen, and the said bars are shown as having both transverse grooves and ribs. Fig. 8 is a similar view of a platen provided with channel-bars of a form similar to Fig. 7, showing transverse grooves; and Fig. 9 is a similar view of a platen having channel-bars of the form shown in Figs. 7 and 8, provided with transverse ribs only.

*a* represents the lower platen, and *b* represents the upper platen, between which the bale is compressed by means of any suitable mechanical devices. Upon the faces of these platens are formed channel-bars *c*, between which are a series of similar grooves *d*, the appearance of the channel-bars and grooves when seen in section or in side elevation, as in Fig. 1, being similar to that of a "dovetail" joint. The surfaces of these channel-bars *c*, which form the opposing faces of the platens, are formed with a curvature or inclination from the center of each platen to its side edges in order to produce a greater pressure upon the center of the bale being compressed than upon the outer portions thereof.

In Figs. 2, 3, and 4 I have shown the channel-bars as provided with a single curvature or convexity, while in Figs. 7, 8, and 9 I have shown these channel-bars as having a double inclination, comprising the two flat surfaces meeting at $c'$ in the center of the platen. In Figs. 5 and 6 I have shown a slight variation of the form shown in Figs. 7 to 9, the inclined surfaces of the platen instead of merging into each other being connected by a short flat portion $c^0$ at the center of the platen.

I have found it advantageous to provide the channel-bars with either grooves or ribs, or both, which depressions or projections give to the surface of the platen a corrugated effect transversely of the channel-bars, which serves to prevent the bale spreading from its center outward while being compressed, due to the convexity of the platens. This roughened or corrugated effect upon the surface of the platens is an important feature of my invention and is not limited in its application to the lower platen, as herein shown, nor to the upper platen, but is preferably applied to both for producing the best results in practice.

In Figs. 2, 3, 5, and 8 I have shown the channel-bars $c$ as provided with transverse depressions or grooves $f$. In Figs. 4, 6, and 9 I have shown these channel-bars as provided with raised projections or ribs $g$, while in Fig. 7 I have shown the provision of both transverse grooves $f$ and transverse projections $g$ upon the surfaces of the channel-bars.

Curved or otherwise convexed channel-bars provided with either the grooves or projections referred to give the surfaces of the platens an irregular or symmetrical corrugated effect, which has been found in practice to be particularly advantageous and effective in preventing the spread of the bale at the same time that the convexity of the platen causes the expulsion of the air therefrom.

The compression of a bale of cotton between platens, as hereinbefore described, will occur at the center first and thence outwardly upon the bale, thus giving the air a chance to be expelled, and it will be found that a bale so compressed after the application of the tie and removal from the press will expand with a force due to the elasticity of the fibers of the material only.

The application of my invention to a cotton-press has among other advantages that of requiring less power for compression and after compression a greater density, which allows of the storage of a greater weight in a given space in a warehouse or on cars or vessels.

It will be obvious that my invention may be applied to existing presses with little cost or change being necessary.

As an advantage of the air being expelled from the bale, the danger of explosion and taking fire of the bale through the heat of compressed air therein furnishes the other advantage of lowering the rates of insurance against fire.

Having thus described my invention, what I claim, and desire to secure by Letters Patent of the United States, is—

1. A platen having its surface provided with a series of ribs having arched or convexed surfaces, extending transversely thereof; and corrugations on the surfaces of said ribs running longitudinally of the platen, substantially as described.

2. A platen having transverse undercut ribs upon the surfaces of which are corrugations which run longitudinally of the platen, substantially as described.

3. A platen having transverse arched or convexed ribs, the sides of which are undercut, and upon the arched or convexed surfaces of which are corrugations which run longitudinally of the platen; substantially as described.

In testimony whereof I affix my signature in presence of two witnesses.

BURCHARD THOENS.

Witnesses:
JNO. J. WARD,
ANDREW OVERO.